Dec. 23, 1930.  J. C. McCUNE ET AL  1,786,214
VACUUM OPERATED HORN
Filed Oct. 19, 1929
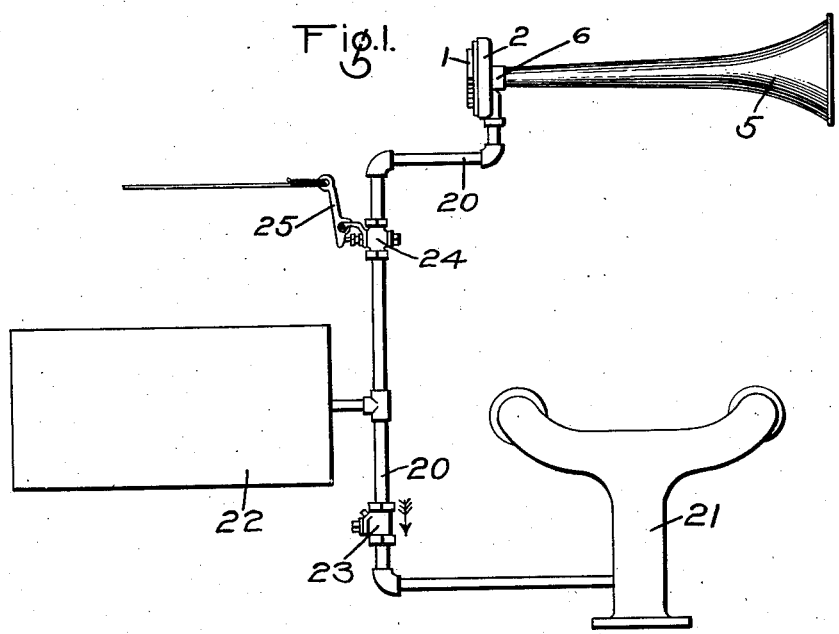
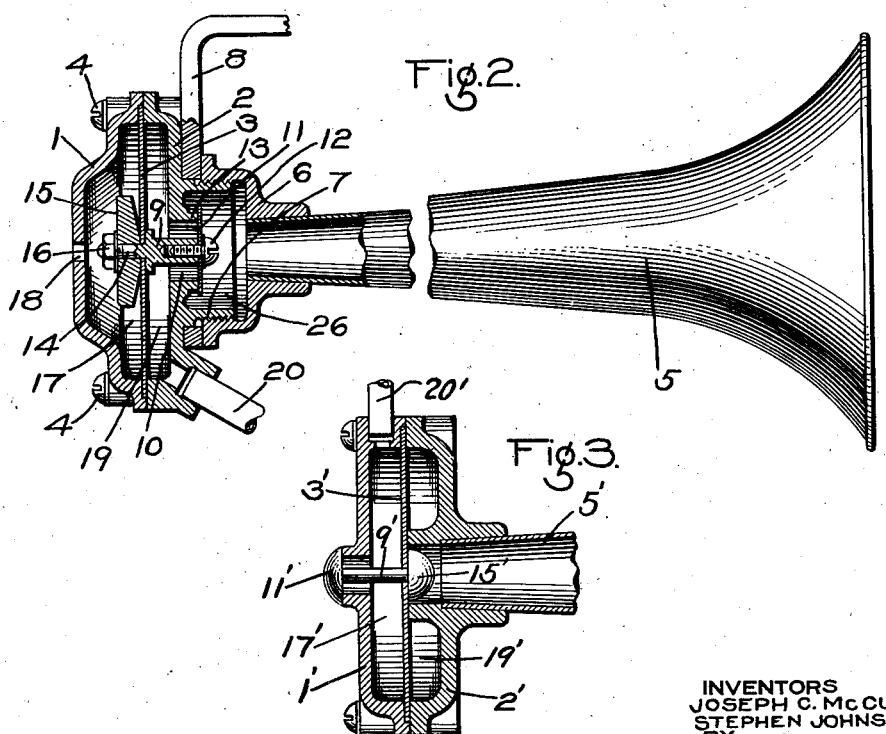
INVENTORS
JOSEPH C. McCUNE AND
STEPHEN JOHNSON JR.
BY
ATTORNEY Patented Dec. 23, 1930

1,786,214

UNITED STATES PATENT OFFICE

JOSEPH C. McCUNE, OF EDGEWOOD, AND STEPHEN JOHNSON, JR., OF PITTSBURGH, PENNSYLVANIA, ASSIGNORS TO THE WESTINGHOUSE AIR BRAKE COMPANY, OF WILMERDING, PENNSYLVANIA, A CORPORATION OF PENNSYLVANIA

VACUUM-OPERATED HORN

REISSUED

Application filed October 19, 1929. Serial No. 400,781.

This invention relates to sound producers, and more particularly to a sound producer of the type employing a flexible diaphragm which is caused to vibrate by variations in fluid pressure.

One object of our invention is to provide a flexible diaphragm sound producer in which the vibration of the diaphragm is produced by creating a partial vacuum on one side of the diaphragm.

Another object of our invention is to provide a flexible diaphragm sound producer in which the vibration of the diaphragm is produced by creating a partial vacuum on one side of the diaphragm and in which a valve is operated by the diaphragm to connect the partial vacuum side of the diaphragm to the atmosphere.

Other objects and advantages will appear in the following more detailed description of the invention.

In the accompanying drawing, Fig. 1 is a diagrammatic view of a sound producing equipment embodying our invention; Fig. 2 a sectional view of the flexible diaphragm sound producing device embodying our invention; and Fig. 3 a sectional view of a modified form of our invention.

As shown in Fig. 2, the improved flexible diaphragm sound producing device may comprise casing sections 1 and 2, between which is clamped a flexible diaphragm 3, the section 1 having an annular recess adapted to receive the diaphragm, and the sections 1 and 2 being clamped together by means of bolts 4.

A suitable horn 5 is secured to a member 6, and said member is secured to an extended cylindrical portion 7 of the section 2 by screw-threaded engagement. A bracket 8 may be clamped between the member 6 and the casing section 2, and the bracket is employed to secure the sound producer in its desired location, such as at a suitable location on a motor vehicle.

Secured to the diaphragm 3, centrally thereof, is a valve stem 9, which stem extends through a relatively large opening 10 in the casing section 2. A thin metal disk valve 11 is secured to the outer end of the stem 9 by means of a headed screw 12 and said valve is adapted to engage an annular seat rib 13 provided centrally of the casing section 2 and surrounding the opening 10.

Integral with the valve stem 9 and extending through a central aperture in the diaphragm 3, is a stem 14 on which is mounted a disk 15, and a nut 16, having screw-threaded engagement with the stem 14, serves to hold the disk 15 in place, as well as to clamp the valve stem 9 to the diaphragm 3. The inner face of the disk may be convex, so as to permit the diaphragm to freely flex when the diaphragm moves toward the right.

The chamber 17 at one side of the diaphragm 3 is open to the atmosphere through an opening 18 in the casing section 1, and the chamber 19 at the opposite side of the diaphragm is connected to a pipe 20, through which a partial vacuum is created in the chamber 19.

As shown in Fig. 1, the pipe 20 may be connected to the intake manifold 21 of an internal combustion engine, and in order to provide a vacuum source at all times, regardless of whether or not the engine is running, a storage reservoir 22 is provided, which is connected to the pipe 20.

A check valve 23 is interposed in the pipe 20, which is adapted to permit flow in the direction of the arrow, but prevents flow in the opposite direction, so that the vacuum accumulated in the reservoir will not be lost by the flow of fluid from the intake manifold to the reservoir.

A controller valve 24 is also interposed in the pipe 20 and is adapted to be operated by pulling a lever 25 to open the valve, when it is desired to operate the sound producer.

In operation, the chambers 17 and 19 at opposite sides of the diaphragm 3 are normally at atmospheric pressure, and the valve 11 may just touch the seat rib 13 or may even be slightly away from the seat rib.

A partial vacuum is created in the reservoir 22 by the running of the internal combustion engine, which creates a partial vacuum in the intake manifold in the usual manner.

When it is desired to operate the sound producer, the valve 24 is opened, so as to permit the creation of a partial vacuum in the chamber 19 of the sound producing device. The partial vacuum created in chamber 19 causes the thin, flexible valve disk 11 to tightly engage the seat rib 13, by the action of the atmospheric pressure which acts on the outer face of the valve and even if the valve disk be slightly away from the seat rib, the disk will be flexed so as to tightly engage the seat.

The atmospheric pressure in chamber 17 moves the diaphragm 3 toward the right against the reduced pressure in chamber 19 and with it the valve stem 9. The valve disk 11 being of thin flexible material tends to hold to its seat and flex during the slight initial movement of the stem 9 toward the right, due to the amospheric pressure acting on its outer face against the partial vacuum in chamber 19 and then the valve is forcibly pushed from its seat and creates a relatively large outlet opening from chamber 19 to the chamber 26 and the interior of the horn 5. A sudden flow of air then takes place from the horn to the chamber 19, causing the quick build up of pressure in chamber 19, so that the diaphragm 3 which is now flexed out of its normal position moves back to its original position, aided by the spring action of the diaphragm. The valve disk 11 again seats on the seat rib 13, so as to cut off the inflow of air to the chamber 19 and then a partial vacuum is again created in chamber 19, so that the diaphragm 3 again moves toward the right in the manner previously described.

The diaphragm 3 is thus caused to vibrate, and by the opening and closing of the valve 11, the air column in the horn is caused to pulsate and thus produce a sound.

The disk weight 15 attached to the diaphragm operates to intensify the vibratory movement of the diaphragm.

According to the modified construction shown in Fig. 3, the vacuum pipe 20' is connected to the chamber 17' at the side of the diaphragm 3' opposite to the horn 5'. A valve 11' is connected by a stem 9' to the diaphragm 3' and controls connection from chamber 17' to the atmosphere.

When a partial vacuum is created in chamber 17', by the opening of valve 24, the atmospheric pressure in chamber 19' shifts the diaphragm 3' toward the left. The valve 11' is then unseated, and air from the atmosphere flows into chamber 17'. As the pressures equalize on opposite sides of the diaphragm, the diaphragm moves back toward the right, so as to operate the valve 11' and cause same to seat. The above action is then repeated and thereby the diaphragm 3' is caused to vibrate, so that a sound is produced by the action of the horn 5', when subjected to a vibratory or pulsating column of air.

The construction shown in Fig. 2 is preferred, since with the Fig. 2 construction a more positive disturbance of the column of air in the horn is produced by the successive withdrawals of air from the horn by the opening of the valve 11. The Fig. 3 construction is shown merely as a possible arrangement within the scope of our invention.

While two illustrative embodiments of our invention have been described in detail, it is not our intention to limit its scope to these embodiments or otherwise than by the terms of the appended claims.

Having now described our invention, what we claim as new and desire to secure by Letters Patent, is:—

1. A sound producer comprising a flexible diaphragm having a chamber at one side constantly open to the atmosphere, a partial vacuum source, manually operated means for connecting said source to said chamber, a horn, and a thin flexible valve operated by said diaphragm for controlling communication from said horn to said vacuum chamber.

2. The combination with a sound producer comprising a flexible diaphragm operable by creating a partial vacuum in the chamber at one side of said diaphragm, of an internal combustion engine intake manifold, a reservoir connected to said manifold whereby a partial vacuum is created in said reservoir, and means for connecting said reservoir to said chamber.

3. The combination with a sound producer comprising a flexible diaphragm operable by creating a partial vacuum in the chamber at one side of said diaphragm, of an internal combustion engine intake manifold, a reservoir connected to said manifold whereby a partial vacuum is created in said reservoir, a check valve for preventing flow of fluid from said manifold to said reservoir, and means for connecting said reservoir to said chamber.

4. A sound producer comprising a flexible diaphragm, means for varying the fluid pressure on one side of said diaphragm, and a weight member secured to said diaphragm and having a convex face adjacent to said diaphragm.

5. A sound producer comprising a flexible diaphragm, means for varying the fluid pressure on one side of said diaphragm, and a disk weight carried centrally of said diaphragm and having a convex face adjacent to said diaphragm to facilitate flexing of the diaphragm.

6. A sound producer comprising a casing, a flexible diaphragm mounted in said casing, means for creating a partial vacuum in the chamber in the casing at one side of the diaphragm, a horn, an opening in said casing connecting said chamber with the horn, and a valve operated by said diaphragm for controlling communication through said opening from said chamber to said horn.

7. A sound producer comprising a casing, a flexible diaphragm mounted in said casing, a horn associated with said casing, a chamber in said casing at the horn side of the casing, means for creating a partial vacuum in said chamber, a chamber in said casing at the opposite side of the diaphragm open at all times to the atmosphere, and a valve operated by said diaphragm for controlling a port opening in said casing for connecting said partial vacuum chamber to said horn.

In testimony whereof we have hereunto set our hands, this 16th day of October, 1929.

JOSEPH C. McCUNE.
STEPHEN JOHNSON, Jr.